United States Patent [19]

Friedrich et al.

[11] Patent Number: 5,605,375
[45] Date of Patent: Feb. 25, 1997

[54] CHILD'S SEAT RESTRAINING SYSTEM

[75] Inventors: Mattias Friedrich, Enger; Volkmar Wölfl, Vlotho-Valdorf, both of Germany

[73] Assignee: Van Riesen GmbH u. Co. KG, Enger, Germany

[21] Appl. No.: 488,747

[22] Filed: Jun. 8, 1995

[30] Foreign Application Priority Data

Jun. 13, 1994 [DE] Germany ............... 44 20 457.4

[51] Int. Cl.⁶ ................................................. A47C 1/08
[52] U.S. Cl. ........................................................ 297/250.1
[58] Field of Search ................... 297/250.1, 484, 297/476

[56] References Cited

U.S. PATENT DOCUMENTS

| | | | |
|---|---|---|---|
| 4,720,148 | 1/1988 | Anthony et al. | 297/476 X |
| 5,160,186 | 11/1992 | Lee | 297/476 X |
| 5,286,090 | 2/1994 | Templin et al. | 297/484 X |

FOREIGN PATENT DOCUMENTS

| | | |
|---|---|---|
| 0295838 | 12/1988 | European Pat. Off. . |
| 1456116 | 5/1969 | Germany . |

*Primary Examiner*—Milton Nelson, Jr.
*Attorney, Agent, or Firm*—Dvorak and Traub

[57] ABSTRACT

A child seat restraining system that is to be affixed in an automobile and a three or multiple point seat belt system includes a belt length adjustment device (16) that has a belt reel (20) which is affixed either on the back side or on the underside of the child's seat with which the effective belt length of at least one piece of belt can be increased or decreased by counteracting or cooperating with a spring force. The belt length adjustment device (16) includes a belt blocking device (24, 25) which is located behind the belt reel (20) in the unwinding position.

2 Claims, 3 Drawing Sheets

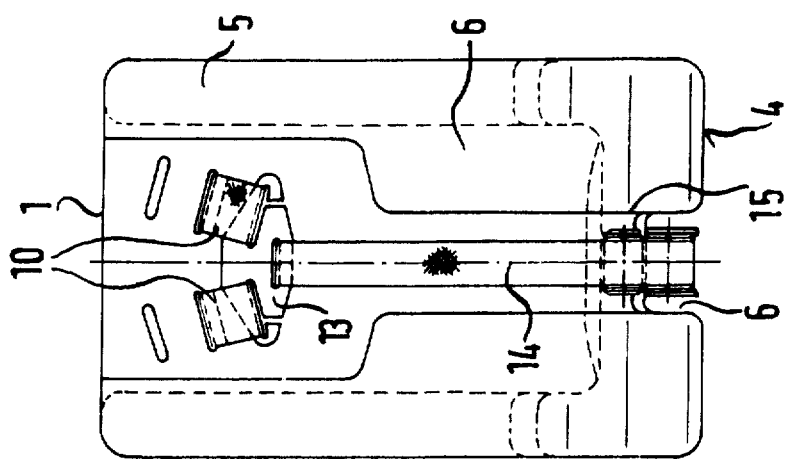
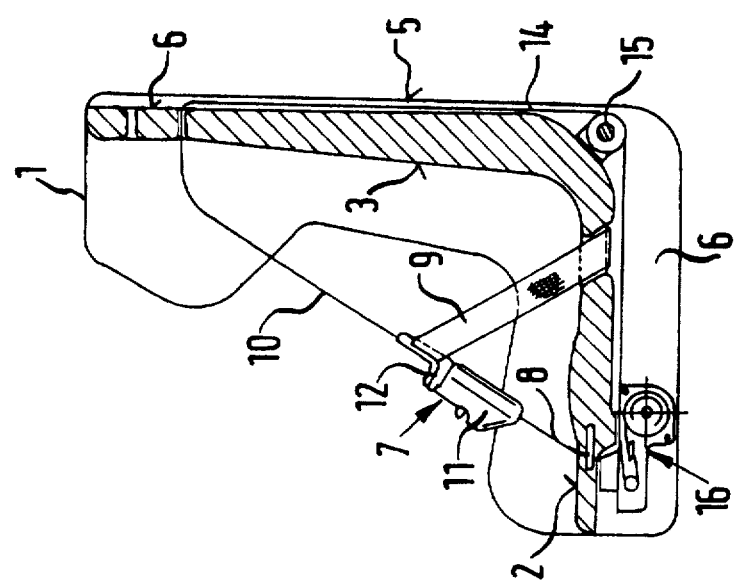
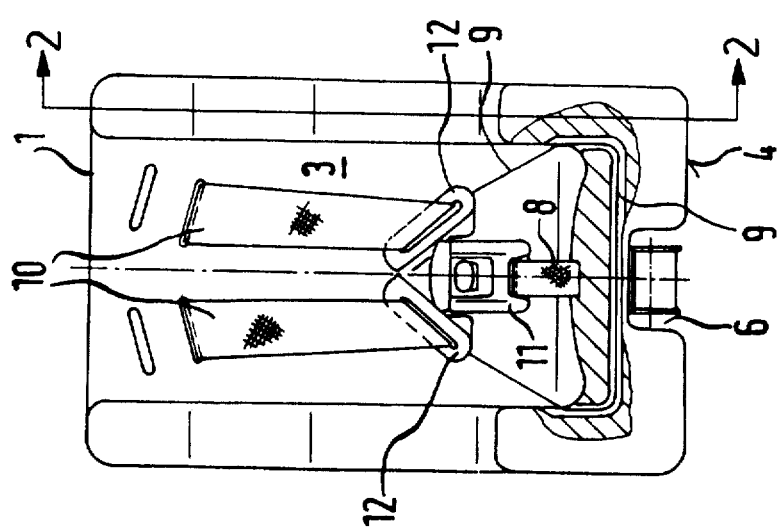

FIG. 4
FIG. 5
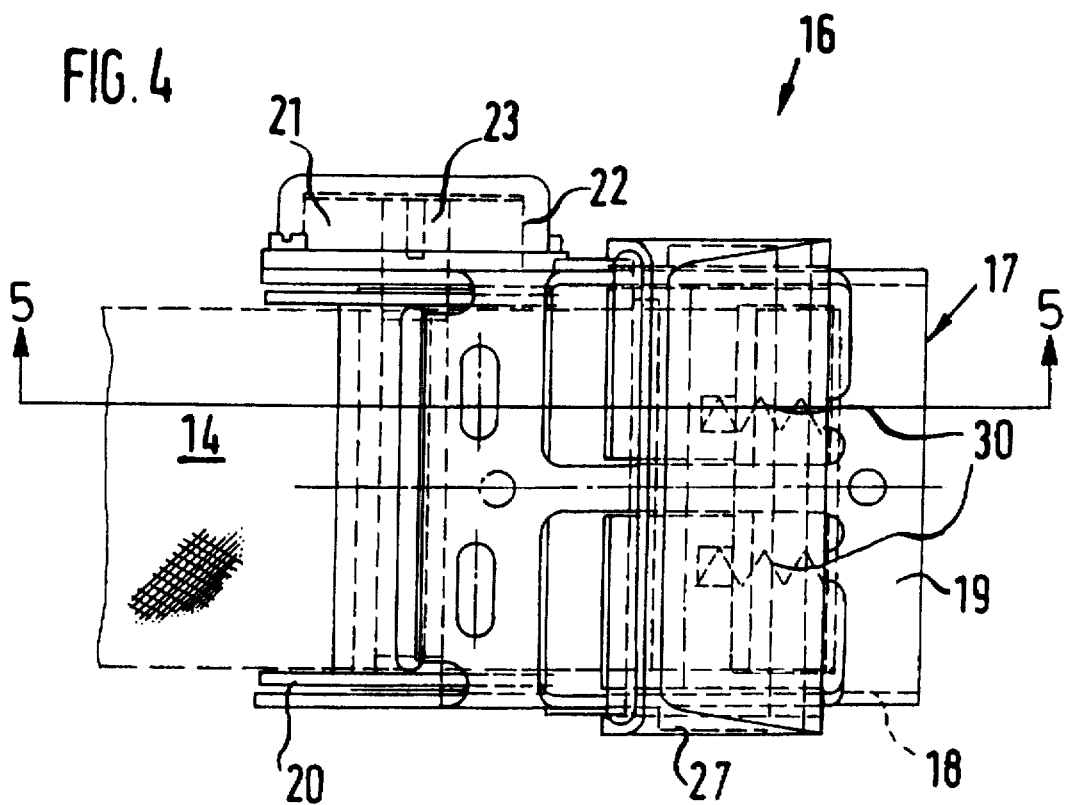
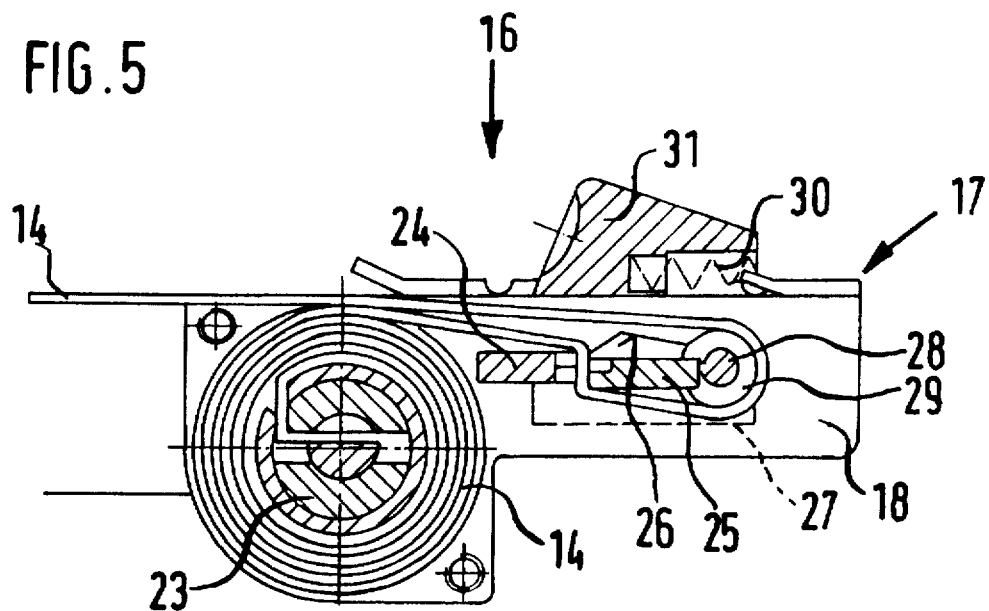

CHILD'S SEAT RESTRAINING SYSTEM

BACKGROUND OF THE INVENTION

The invention deals with a child's seat restraining system.

Such child's seat restraining systems are available in numerous embodiments. Essentially they consist of a child's seat which is fastened, either directly or indirectly by way of a frame, to the car seat by means of a two-point or three-point safety belt available in the automobile. The child is secured within the seat by means of a multi-point belt system, usually a four or five-point belt system.

Although such child's seat restraining systems are divided into groups where each group corresponds to a certain size or weight range, in practice tremendous size differences have to be bridged reliably, which is essentially done by adjusting the effective belt length. For example, child's seat restraining systems with four-point belts are known, whereby a waist belt and two shoulder belts are interconnected by means of a central buckle. Shoulder belts as well as the waist belt must be equipped with devices allowing adjustment of belt length. Belt deviating systems which are designed to increase friction by winding the belt around pins are the simplest devices of this kind. However, they are often difficult to adjust. Consequently, adjustment of the effective belt length, which is absolutely essential to meet the safety requirements based on the size of the child, is often not done at all, or at least not in the required manner.

EP 0 261 453 B 1 discloses a device for adjusting the belt length of a safety belt system wherein upon actuating a release control and overcoming a spring force, the belt can be unwound from the belt reel in order to obtain a greater effective belt length. When not actuated the reel is locked and the effective belt length is fixed. This kind of device for adjusting belt length is utilized, for example, on the shoulder belts of the above described child's seat restraining system with a four-point belt. It is intended that the effective belt length of these shoulder belts be increased before putting them on, and after they are put on, that the release control be actuated again whereby the spring action automatically pulls the excess belt length until the belt is as tight as determined by the spring force. This force is designed so that under normal circumstances, the resulting effective belt length is optimal.

This kind of belt length adjustment device is proven in practice. However, it is still felt disadvantageous that each shoulder belt must be equipped with a separate belt length adjustment device and that because of the exposed location of the device, the child himself can actuate it, which could lead to an unintentional lengthening of the effective length. An additional disadvantage is the fact that although the reel locks reliably because its angular movement is positively blocked, the remaining belt slippage around the blocked reel depends on the length of the wound up belt. Thus, the system with a fully wound reel contains more slack than the one with an empty reel.

Also known are child's seat restraining systems where the effective belt length of all belts is adjusted by a central adjustment device. The effectiveness of these systems depends largely on the force applied on the central adjustment device, which is a disadvantage.

DE 36 15 443 A1 discloses a child's seat restraining system with a central adjustment device located underneath the seat. Here the belt is indeed wound up and tensioned by a spring loaded reel, but the belt is arrested by mechanically locking the reel. This leads to belt slippage as the belt tightens around the reel under increasing load, especially when the reel is fully wound. This represents an increased safety risk, since the belt must be tightly strapped around the body, especially when the working load is applied.

SUMMARY OF THE INVENTION

With the above shortfalls in mind, the object of the present invention is to create a child's seat restraining system which, on the one hand ensures a reliable and reproducible adjustment of the effective belt length, but on the other, effectively prevents the above mentioned slippage under a working load. Furthermore, such a child's seat restraining system is to be produced economically and is to handle reliably, especially when used in different automobiles.

According to the invention, belt length is not controlled by a blockable belt reel but by a device which blocks the belt itself. This belt blocking device is located (in the unwining direction) behind the belt reel and traps the belt within it. This embodiment both effectively prevents belt slippage when the working load is applied and considerably simplifies the construction of the belt length adjustment device, since the belt reel and the associated reel bearing must cope with the winding-on force only, and not with the working load. The belt blocking device is of relatively simple construction, since only the slip-free blocking function has to be ensured. Since the belt blocking device does not block the belt reel but the belt itself, the same slip-free holding force is ensured, independent of the windings. Thus, the solution according to the invention retains the advantages of a spring loaded belt length adjustment device and avoids the above described disadvantage of slippage. After the release control is actuated the belt system is always tensioned with approximately the same force, so that given an appropriate belt design, optimal fit is ensured independent of the size of the child or the kind of clothing he is wearing. When a length change is needed, this required spring tension force is obtained before buckling up and after actuating the release control, by overcoming the spring force and extracting the belt from the belt length adjustment device. The energy stored in the spring is then available for tightening the belt sytem after putting the belt on and actuating the release control. This means that a manual adjustment of the effective belt length becomes completely unnecessary so that, in the ideal case after actuating only one operating button, the entire belt system is in its intended optimal position.

A particular advantage of this embodiment is the fact that the belt length adjustment device is located at the back or underside of the seat where the child cannot reach it and cannot manipulate it. Only the means for operating the release control is accessible from the front or the side, but preferably arranged in such a manner that the buckled up child cannot reach it. This can be realized, for example, by locating an appropriate operating button in an appropriate recess underneath the forward portion of the lower seat area.

In order to enable a central adjustment of the shoulder belts using only one belt length adjustment device, it is advantageous to combine the shoulder belts behind the seat into one common belt, preferably by means of a gusset plate, and to connect this common belt to the belt length adjustment device. This also ensures that both shoulder belts are of equal length, which is important for the safety of the system.

Separate waist belts are preferably not used, but the shoulder belts are tied in with the waist belts by way of a central belt buckle or other deviating means. The free ends of the waist belts are then tied to either the seat or to each other under the seat, so that the length adjustment of the shoulder belts and the waist belts is done simultaneously. In this way central adjustment is possible. Tension force adjustments can be made, if required, for example on the waist belts by means of known block and tackle type of systems.

A preferred embodiment according to the invention is the belt length adjustment device complete with release control and associated operating means (for example an operating button) which is designed as a complete unit which is essentially independent of the individual seat construction and which can be retrofitted if necessary. This kind of embodiment is especially advantageous from a construction view point, since the operating means are directly associated with the operating devices.

Depending on type and design of the child's seat restraining system and especially the of seat itself, it can be useful to divide up the belt length adjustment device into two units: one comprising the operating means for the release control, and the other comprising the remaining components. Both units are functionally interconnected by a transmitting means such as a Bowden control cable in flexible steel conduit, a piece of belt, a control bar, or other means such as pneumatic or hydraulic. This kind of embodiment has the advantage that, on the one hand, the operating means can be positioned at a virtually arbitrary location on the seat, and on the other hand the remaining parts of the belt length adjustment device can be positioned in such a manner that, for example, the belt layout or the force action is particularly favorable.

The belt blocking device is preferably designed as a clamping device where the minimum required clamping action is applied by spring force but additional clamping force, derived from the working load, is applied on a suitably positioned clamping jaw.

This effect can be achieved, for example, by guiding the belt around a deviating roller whose axis transmits clamping force to one of the clamping jaws when the working load is applied.

A preferred construction utilizes a U-shaped support body which is connected to the seat or seat frame and which serves as a bearing for the belt reel and supports the belt blocking device. Clamping jaws can be installed in this U-profile, whereby one jaw is movable and located in an appropriate recess. The flanges of the U-profile are overlapped by a construction element which is guided on the U-profile and supports the movable clamping jaw and its load bearing axle carrying the deviating roller of the belt. In this manner the clamping action is increased simply and cheaply when the working load is applied. Furthermore, the construction element overlapping the U-profile has limited mobility on the U-profile and is spring loaded in such a manner that the movable clamping jaw is in clamping mode when the release control is not actuated. An operating button or lever located on this overlapping construction element actuates the release control. This kind of construction element can be produced cheaply and can be applied reliably and securely.

DETAILED DESCRIPTION OF THE DRAWINGS

The invention is explained in more detail with the help of an exemplary embodiment which is shown in the drawings wherein:

FIG. 1 shows in greatly simplified representation of a partially sectioned front view of the child's seat restraining system according to the invention;

FIG. 2 shows an end view in partial cross-section through the child's seat restraining system according to FIG. 1;

FIG. 3 shows a back view of the child's seat restraining system according to FIG. 1;

FIG. 4 shows a top view of the belt length adjustment device of the child's seat restraining system according to FIG. 1;

FIG. 5 shows an end view in partial cross section through the belt length adjustment device according to FIG. 4 with the belt blocking device shown in a blocked position.

DETAILED DESCRIPTION OF THE PREFERRED EMBODIMENT

Figure 6:
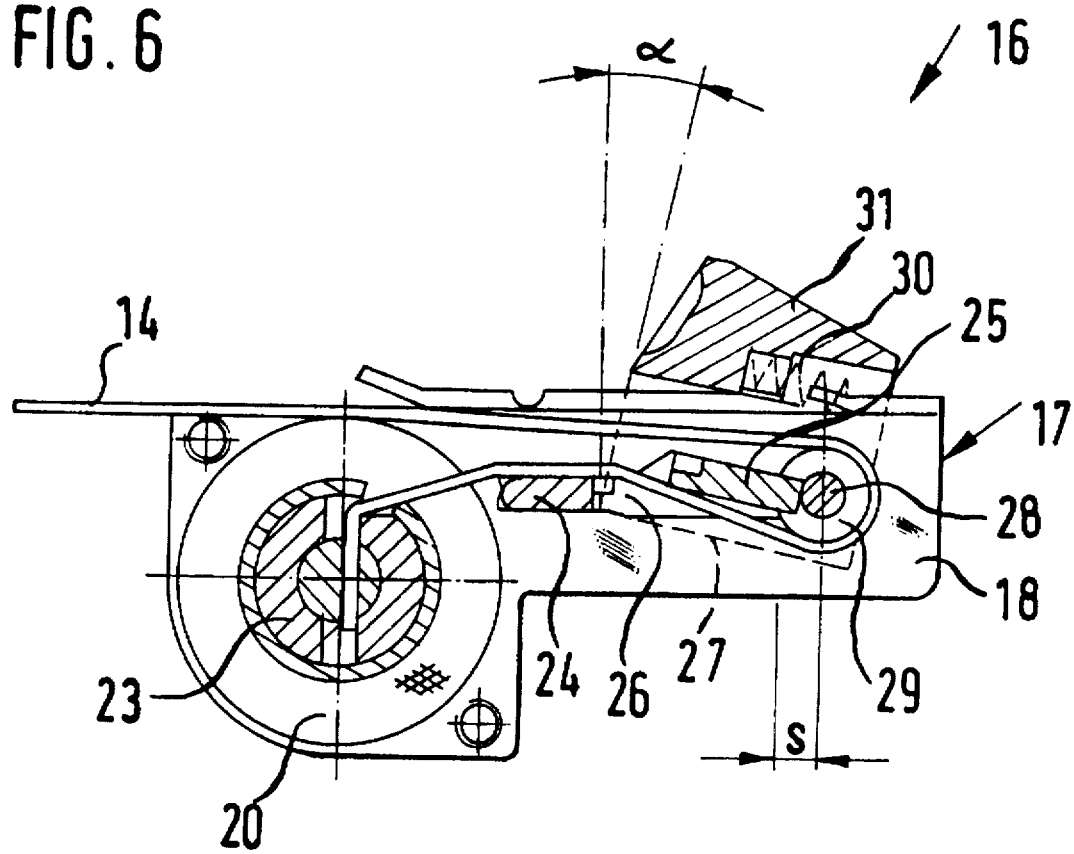
FIG. 6 shows an end view in partial cross section of the belt length adjustment device according to FIG. 5, in a released position.

The child's seat restraining system represented in the Figures shows a child's seat 1, which is designed as a plastic shell and is molded in the seat area 2 and the back rest area 3 in the usual manner corresponding to the anatomy of a child. The child's seat 1 has a base area 4 and a contact area 5. The child's seat 1 is supported in these areas 4 and 5 on the seat and back rest of an automobile seat, respectively. The areas 4 and 5, shown in FIG. 1 to 3, are not flat but raised along the sides so that an empty space 6 is created between the actual seat 1 and the automobile seat (not shown). The child's seat 1 is designed to be fastened to the two-point or three-point safety belt available in the automobile. Instead of a fully molded shell design, the seat can also consist of the seat proper and a support frame, so that it is possible to recline the seat into a sleeping position.

The represented child's seat 1 is equipped with a five-point belt system with a central belt buckle 7. It shows a crotch belt 8, two waist belts 9 and two shoulder belts 10. The crotch belt 8 is fixed on one end to the seat within the seat area 2, and on the other to the buckle housing 11. The shoulder belts 10 transform into the waist belts 9 by means of two guide slots formed by two slip-on parts 12. Belts 9, 10 have free ends that are either fixed to the seat, or, as in the present embodiment, pass through it and are connected underneath the seat. In this manner, shoulder belts 10 and waist belts 9 consist of one single piece of belt whose ends pass through two slots in the back rest and are fixed on the back side to a gusset plate 13, from where a belt 14 runs down the back side, over a deviating roller 15, underneath the seat and to a central belt length adjustment device 16.

The belt length adjustment device 16, which is represented in FIGS. 4 to 6, is located in the empty space 6 on the underside of seat 1. It shows a U-shaped support body 17 which is connected to the seat 1. The support body 17 is arranged such that it has flanges 18 point downward and its web 19 is approximately parallel to the seat area 2.

The belt reel 20 is hinged between the flanges 18. The axle of reel 20 supports a shaft 23 which, on one side, passes through the flange 18 and is connected to the inner end of a roll spring 21 whose outer end is connected to the support body 17. The protruding shaft end and the roll spring 21 are covered with a cap 22 which is screwed to the corresponding flange 18 of the support body 17. One end of the belt 14 is fixed to the shaft 23, and the other, to the gusset plate 13. FIGS. 5 and 6 show the end of belt 14 and several layers of belt wound on the belt reel 20.

Behind the belt reel 20 in unwinding direction, there is a clamping device. The clamping device is comprised of a fixed clamping jaw 24 and a movable clamping jaw 25, whose opposing front faces are notched on opposite sides so that the belt passing through them can be reliably fixed by their clamping action. Whereas the clamping jaw 24 is fixed in one part of the recess 26 of each flange 18, the movable clamping jaw 25 is located in the other part of the recess 26, which is curved for the benefit of the movable clamping jaw 25. The clamping jaw 25 is actually seated on a U-shaped construction element 27 which is movable and supported on support body 17 and overlaps it in this region. In the side flanges of construction element 27, there is seated not only clamping jaw 25 which is vertically movable and whose face is directed towards clamping jaw 24, but also immediately behind clamping jaw 25, an axle 28. Axle 28 also passes through recesses 26 in flanges 18 of support body 17 and supports a deviating roller 29. Since recess 26 is closed all around, the displacement of construction element 27 on support body 17 is limited. This displacement is shown in FIG. 6 and is denoted "s"

The overlapping construction element 27, whose movement is limited by the recesses 26 in the flanges 18 is not only displaceable by an amount "s", but additionally, can be rotated by an angle denoted by Greek letter alpha ($\alpha$) (see FIG. 6). This enables a nearly friction-free movement of the belt when the clamping device is in the released position (FIG. 6), since the movable clamping jaw 25 is completely removed from the belt 14.

The overlapping construction element 27 is spring-loaded against the support body 17 by means of two compression springs 30. The upper side of the construction element 27 is equipped with a button 31 which is fixed to this overlapping construction element 27 and which is accessible from the front of the seat through a recess underneath the seat area 2 of seat 1. By pressing this button and displacing it by a distance "s" and simultaneously rotating it by an angle alpha, the clamping device is moved against the spring force from the blocked belt 14 position (FIG. 5) to a released belt 14 position (FIG. 6). Then the belt 14 can be unwound by overcoming the force of the roll spring 21, thereby lengthening the shoulder belts 10 and the waist belts 9.

In practice, after the lengthening of the belts 9 and 10, the child will be placed in the seat and the belt buckle 7, will be locked. Then, by pressing the button 31 again, the entire belt system can be brought in the intended position by the spring action of the roll spring 21, after which the button 31 is released and the belt 14 is automatically fixed by the clamping jaws 24 and 25. When the working load is applied, this clamping action is further increased by the force applied by the deviating roller against the clamping jaw 25.

Instead of the above described fixed clamping jaw 24 and the movable clamping jaw 25, one can also divide the movements by appropriate guide cams, so that the clamping jaw 24 with its front face directed toward the clamping jaw 25, swings downward, while the clamping jaw 25 only translates in the displacement direction. In this way, angular movement of the overlapping construction element 27 is completely unnecessary. Here, the clamping jaw 24 would swing downwardly aided by its own weight to free the belt 14, while at the same time, the clamping jaw 25 and the deviating roller 29 are being retracted.

We claim:

1. A child restraint seat for securing a child therein, said seat affixed to an automobile bench having a seat and a back portion, said restraint seat being affixed to said automobile bench by an automobile seat belt system, said child restraint seat comprising:

a molded plastic shell having a seat area and a backrest area for receiving said child therein, and a base area and a contact area, each having respective raised sides, said raised sides of said base area creating a centrally located empty space along said seat area between said base area and said automobile seat when said child restraint seat is affixed to said automobile bench, said raised sides of said contact area creating an empty space along said backrest area between said contact area and said automobile back portion when said child restraint seat is affixed to said automobile bench, said empty space along said seat area defining an underside of said child restraint seat, said empty space along said backrest area defining a back side of said child restraint seat, said molded shell including an opposed pair of slots extending from said backrest area to said contact area, each of said pair of slots generally located near a respective raised side of said backrest area;

a restraint seat belt system comprised of a central buckle having a housing, a crotch belt, a first and second waist belt, a first and a second shoulder belt, a gusset plate, a pair of slip-on parts, that are removably attachable to a buckle housing, and a belt extending between and within said empty space of said seat area and said backrest area, said crotch belt having a pair of ends wherein one end is attached to said seat area and the other end to said buckle housing, said first and second shoulder and waist belts integrally formed from a single piece of belt housing having a pair of ends, wherein a one belt end is passed through one of said pairs of slots and is attached to said gusset plate located within said empty space on said back side of said child restraint seat, and another said belt end is passed through the other of said pair of slots and is attached to said same gusset plate, said single piece of belt passed through each of said slip-on parts so as to transform the single piece of belt into said first and second waist belts and shoulder belts, said belt having an effective length and a pair of ends, wherein one end is attached to said same gusset plate and said other end extends downwardly through said empty space of said backrest area and through said empty space of said seat area;

a belt length adjustment device that receives said other end of said belt, said device located within said empty space of said seat area, away from said backrest area, said adjustment device comprised of a unit having a U-shaped support body attached to said base area of said molded shell, said support body formed from a pair of opposed flanges and an interconnecting web, each of said flanges provided with recesses therein for hingedly receiving a belt reel that has said other end of said belt attached thereto and a belt blocking device, said belt blocking device engaging said belt on said belt reel and located behind said reel in an unwinding direction so that operation of said adjustment device blocks said belt and not said belt reel, said belt reel mounted on a shaft that extends between said flanges of said support body, wherein an end of said shaft protrudes beyond a respective said flange and receives a roll spring, said roll spring for maintaining a force on said belt reel so as to keep said belt wound around said reel, said belt blocking device comprised of a U-shaped construction element having a pair of side flanges and a web which overlaps said interconnecting web and said flanges on said U-shaped support body and is guided by said support body flanges, said side flanges of said construction element having respective recesses therein for receiving a fixed clamping jaw, a movable clamping jaw and a deviating roller mounted on a axle that extends between said flanges of said construction element, said belt wrapped around said deviating roller, said roller in contact with said movable clamping jaw when said blocking device is operated, each of said jaws having a respective front face wherein said front faces are in opposed relationship and receive said belt therebetween, said movable clamping jaw rotationally and laterally movable within said recess upon operation of said blocking device and said deviating roller, whose axle transmits loads in a clamping direction;

wherein said movable clamping jaw is spring loaded and is operably movable within said recess by actuation of a release control functionally interconnected to said blocking device, such that operation of said release control disables said blocking device so that said effective length of said belt can be one of increased and decreased by respectively counteracting and cooperating with said spring force of said roll spring, wherein release of said release control causes slip-free blocking of said belt by said blocking device.

2. The child restraint seat according to claim 1, wherein the release control is equipped with an operating button which is accessible from a front of the restraint seat through said empty space underneath the seat.

* * * * *